9053X
J. Gearhart.
Thrashing Machine.
Patented Aug. 27, 1835.
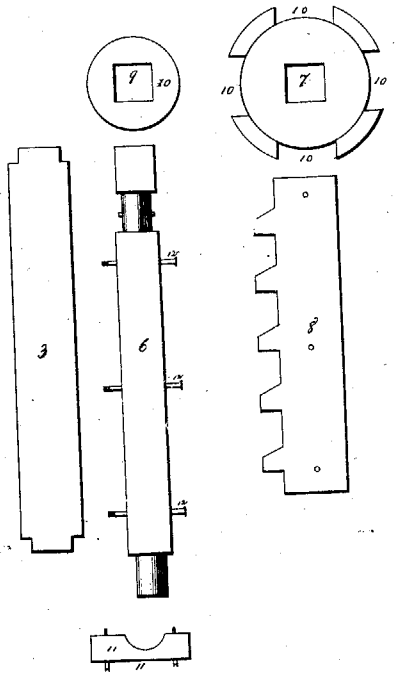
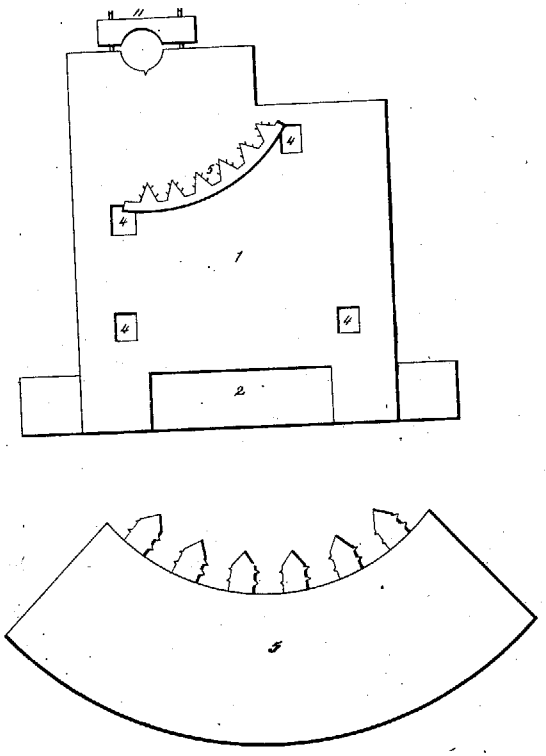

Aug. 22. 1835 9053X 161.

John Gearhart, Rush, Pennsylvania.

Letters Patent.

The Schedule referred to in these Letters Patent and making part of the same containing a description in the words of the said John Gearhart himself of his improvement in the machine for threshing grain and seed.

To all to whom these presents shall come.

Be it known that I John Gearhart of Rush in the County of Northumberland and State of Pennsylvania have invented a new and useful improvement in the machine for thrashing grain and seed and that the following is a full and exact description of the said improvement. This Machine consists of a frame, concave bed cylinder, pulley, and the necessary fixtures for putting the whole together. The frame may be made as represented in the drawing or in any other way the Mechanic may prefer so as to correspond with the other parts of the Machine. Frame two pieces of plank uprights (fig 1) into two sills (fig 2) and join them by four girders (fig 3) entering the Mortices (fig 4) the concave bed (fig 5) is made whole, of cast iron or any other material that may be prefered of any desired size, with rows of teeth on the concave surface of such number shape and size as may be prefered, and is secured on the two upper girders (fig 3) in such a manner as the mechanic may choose. concave beds of different degrees of fineness suited to the grain or seed to be thrashed may be used in the same frame by having them so put in as to be removed at pleasure. the cylinder is composed of the shaft (fig 6) the circular pieces (fig 7) which may if preferred, be made whole; of the Flanches (fig 8) and of the pulley (fig 9) and must correspond with, and be made to fit the concave bed, one end of the shaft projects beyond the side of the frame to receive the pulley with gudgeons at each end where it rests on the frame with

9053X with as many circulars upon it as the length may require and
holes through it to receive the bolts (fig 13) The circulars if they
and the shaft are of wood or metal, may be made together whole,
if of wood by turning, if of metal to be cast by running them solid
if of metal to be forged by welding them together. The circulars must
be of a diameter to correspond with the concave bed with boxes in
(fig 10) of any desired number to receive the flanches on their
periphery. The flanches made of cast iron or any other ma-
terial are of a concave form of the same length with the concave
bed, of the same circular concavity and of a width and in
thickness to correspond with the boxes in the circulars on the
shaft with teeth on their periphery corresponding with those on the
concave bed and holes through them corresponding with those on the
shaft, and of a number to correspond with the number of boxes in the circu-
lars. These form the outside of the cylinder and are secured to the cir-
culars by long bolts (fig 13) passing through them and the shaft with a
head at one end and a bur at the other. The pully on the end of the shaft
must be of a size to correspond with the circumference of the cylinder
the cylinder thus formed is put into the frame and secured by the caps and
screws (fig 11) and is put in motion by putting a strap or other fixture on
upon the pulley and connecting it with any propelling power that may be
deemed proper. What I claim as my invention or improvement in
the Machine for thrashing grain and seed is the mode of construct-
ing concave beds and cylinders as above set forth, the concave
bed differs from those of other thrashing machines by being whole
instead of being in segments and of course is more solid and therefore
can be put in or taken out of the frame with much greater facility
The cylinder differs from those of other thrashing machines by being
open instead of close which gives a much greater proportion of
weight to the periphery and consequently greatly increases its force
without increasing friction, and is propelled by a less power
Exd. than the close cylinders; July 10th 1835.

W.C. Witnesses L. C. Judson
Lyman Sholes

John Gearhart
(806 words)

(Drawing.)